United States Patent
Frisch et al.

(10) Patent No.: US 9,470,562 B2
(45) Date of Patent: Oct. 18, 2016

(54) SPINDLE FLOW METER

(71) Applicant: KEM Küppers Elektromechanik GmbH, Karlsfeld (DE)

(72) Inventors: Jürgen Frisch, Diedorf (DE); Harald Bieling, Pasenbach (DE); Thomas Steuer, Dachau (DE); Dirk Boguhn, Munich (DE)

(73) Assignee: KEM KEUPPERS ELEKTROMECHANIK GMBH, Karlsfeld (DE)

( * ) Notice: Subject to any disclaimer, the term of this patent is extended or adjusted under 35 U.S.C. 154(b) by 0 days.

(21) Appl. No.: 14/922,548

(22) Filed: Oct. 26, 2015

(65) Prior Publication Data

US 2016/0116312 A1   Apr. 28, 2016

(30) Foreign Application Priority Data

Oct. 28, 2014   (DE) .................. 10 2014 115 663

(51) Int. Cl.
*G01F 1/28* (2006.01)
*G01F 1/10* (2006.01)
*G01F 3/10* (2006.01)

(52) U.S. Cl.
CPC .. *G01F 1/10* (2013.01); *G01F 3/10* (2013.01)

(58) Field of Classification Search
USPC ....... 73/861.74, 861.77, 861.78, 261, 861.03
See application file for complete search history.

(56) References Cited

U.S. PATENT DOCUMENTS

| | | | | |
|---|---|---|---|---|
| 5,447,062 A * | 9/1995 | Kopl | ...................... | B67D 7/085 73/261 |
| 6,089,102 A * | 7/2000 | Bloss | ....................... | B67D 7/20 702/46 |
| 6,196,065 B1 * | 3/2001 | Henksmeier | ............. | B67D 7/16 222/71 |
| 6,250,151 B1 * | 6/2001 | Tingleff | ................... | G01F 3/10 73/253 |
| 6,375,434 B1 * | 4/2002 | Taivalkoski | .............. | G01F 3/10 417/63 |
| 7,546,778 B2 * | 6/2009 | Amante | ................... | G01F 1/115 73/861.75 |
| 2014/0116154 A1 * | 5/2014 | Seidel | ....................... | G01F 1/46 73/861.68 |

FOREIGN PATENT DOCUMENTS

| DE | 4208869 A1 | 9/1993 |
|---|---|---|
| DE | 19513781 B4 | 11/1995 |
| WO | WO93/12405 | 6/1993 |

* cited by examiner

*Primary Examiner* — Jewel V Thompson
(74) *Attorney, Agent, or Firm* — Dinsmore & Shohl LLP

(57) ABSTRACT

The invention relates to a spindle flow meter with a housing which has two recesses. In the recesses two multi-turn screw spindles are arranged which are provided to be rotatable in the housing. It is provided according to the invention that the pitch circle diameters of the two screw spindles are of equal size.

11 Claims, 3 Drawing Sheets

SPINDLE FLOW METER

BACKGROUND

Spindle flow meters are used to determine the flow of a fluid. They are used for example in fuel pumps at service stations to determine the amount of fuel discharged which forms the basis for the bill.

The fluid flows through between the screw spindles engaging in each another and sets these in rotation. In more exact terms, there is a respective conveying chamber between the screw spindles engaging in each other, in which a part of the fluid is conveyed from the start of the screw spindle pair to the end thereof. The screw spindles hereby rotate. The rotation of at least one of the screw spindles is detected. By means of the rotation of the screw spindles and the conveying chamber or the transport volume thereof the amount of fluid that has flowed through the spindle flow meter can thus be determined.

Precisely in the case of discharge at fuel pumps, there is a high need for measurement precision which may not decrease over long periods of use.

SUMMARY

The invention relates to a spindle flow meter with a housing which has a first and a second cylindrical recess. These recesses are arranged parallel to each other and so that they at least partially overlap. In each of the two recesses a first and a second multi-turn screw spindle are respectively arranged which engage in each other and are fixed to be freely rotatable in the housing. The diameter of the first recess is hereby substantially equal to the tip circle diameter of the first screw spindle and the diameter of the second recess is substantially equal to the tip circle diameter of the second screw spindle.

Generic spindle flow meters are known for example from DE 195 13 781 B4, DE 42 08 869 A1 or WO 93/12405.

It is the object of the invention to create a spindle flow meter which facilitates measurement with high precision.

This object is achieved according to the invention by a spindle flow meter with the features of claim 1.

Advantageous embodiments of the invention are indicated in the sub-claims and the description.

A generic spindle flow meter is further developed according to the invention in that the pitch circle diameters of the first and the second screw spindles are of equal size.

According to the meaning of the invention the pitch circle diameter can be defined in a simplified manner by the following formula:

$$\text{Pitch circle diameter} = \frac{\text{Root circle diameter} + \text{tip circle diameter}}{2}$$

In toothed components the tip circle diameter behaves equivalently to the number of teeth. For a gearing with the transmission ratio i $$i = \frac{z_1}{z_2}$$

wherein $z_1$ is the number of teeth of the first gearwheel and $z_2$ the number of teeth of the second gearwheel, the tip circle diameter is determined by $$d_{a1} = \frac{z_1}{z_2} \times d_{a2}$$

wherein $d_{a1}$ and $d_{a2}$ are the tip circle diameters of the two gearwheels.

Only quite small deviations from the tip circle diameter are hereby possible, as otherwise the rolling capability of the gearing would be impaired. This proportionality applies similarly also to the pitch circle diameter.

To clarify, reference is made in this connection to FIG. 4, which illustrates a cross-section through two screw spindles 91, 92 in engagement with each other.

As can be seen in particular from FIG. 4, the screw spindle 92 with the three teeth or cut vanes has a larger tip circle diameter than the smaller screw spindle 91 with the two cut vanes. Such a design facilitates good rolling properties which are advantageous for torque transmission from one screw spindle 91 to the other screw spindle 92.

Through this shaping, however, the disadvantage in use in spindle flow meters is that only a very low transport volume is available for the fluid to be measured. In other words, such dimensions are rather impractical.

Accordingly the ratio described above for typical screw spindles in pump or measurement spindle arrangements is reversed, as shown for example in FIG. 5.

The screw spindle 93 with the larger tip circle diameter hereby has the lower number of vanes. In this case the larger screw spindle 93 is designed with two vane or screw threads, whereas the smaller spindle 94 is designed with three vanes. Such dimensions have a relatively large transport volume but have poor rolling properties due to the deviation from the previously described standard. In other words, the components slide more on each another than they roll on each another. This results in spindle flow meters with such dimensions having for example poor start-up behaviour.

This has been recognised by the invention. It is thus a core idea of the invention to deviate from the usual ratio of the two screw spindles relative to each other and to form the two screw spindles used in the spindle flow meter so that they have a substantially equal sized pitch circle diameter.

This results in the transport volume being reduced in comparison with conventional dimensioning, as shown in FIG. 5, but the rolling properties clearly improve. The screw spindles in the spindle flow meter according to the invention are thus more smooth-running than in conventional constructions. They have better start-up behaviour and can also be operated more easily with a higher number of revolutions, which in turn compensates for the lower transport volume.

The better rolling properties also result in higher precision and a lower drift in measurement precision.

According to an advantageous embodiment of the invention the root circle diameters of the two screw spindles are also of equal size. Alternatively or additionally, the tip circle diameters of the two screw spindles can also be formed to be of equal size. In other words, screw spindles can be used which each have the same root circle diameter and also in each case the same tip circle diameter and differ merely in the number of threads or vanes.

It is preferable if the first and the second screw spindle are designed to be of equal length. Such a design allows a simple construction of the spindle flow meter, as substantially the same principle can be used for fixing the two screw spindles within the housing of the spindle flow meter.

It is advantageous if the first and the second screw spindle are arranged offset relative to each in the flow direction, wherein an overlap region is provided, in which the two screw spindles engage in each other. The provision of an offset essentially allows the space within the housing to be utilised well and the general construction size of the spindle flow meter to be reduced.

In principle the feed and discharge channels for the fluid can be arranged at any points on the spindle flow meter. It is advantageous, however, if a feed and a discharge channel are provided coaxially with the axes of the first and the second screw spindle and the channels respectively end in the region of the two screw spindles. In other words, the fluid to be measured is fed from the front in the axial direction of the screw spindles to the spindle flow meter and discharged again behind likewise in the axial direction. This also facilitates, besides lower flow losses, a particularly compact structure.

It is preferable if the first and the second recess are produced by means of bores in the housing. This is possible, as the feed and discharge channels likewise extend in the direction of the axes of the recesses which are equal to the axes of the screw spindles.

The housing advantageously has two cover-like closure elements, through which the feed channel or discharge channel extend. The closure elements serve on the one hand to fix the screw spindles with their bearings in the housing and on the other hand to close this housing in a fluid-tight manner. The cover elements can further have connection devices, for example for pipes or other lines, in order that the fluid to be measured can be fed to the spindle flow meter and discharged away from it again.

To measure the spindle rotation, two sensors are preferably provided on or in the housing laterally with respect to one of the two screw spindles to detect a vane of one of the two screw spindles rotating past the sensor. These sensors can for example be Hall sensors which detect a change in the magnetic field through the vanes of a screw spindle rotating past. In principle, however, other sensor types, for example capacitive sensors, are also possible.

According to the meaning of the invention a screw spindle, in particular the raised part, or elevation, between two turns of a thread, can be regarded as the vane.

It is advantageous if the two recesses and also the two screw spindles have such dimensions that more than 300 pulses are generated respectively at a sensor for each litre of fluid flowing through. Such a design is advantageous in order to achieve sufficiently high measurement precision, in particular for use at service stations. It is hereby preferable if even more pulses, for example 400 pulses per litre of medium flowing through, are generated by each sensor.

To improve the sliding properties and/or to increase the corrosion and/or abrasion resistance of the screw spindle surfaces these can be coated, for example with TLC, and or hardened.

It is preferable if the screw spindles have a pitch of 2:3. The term "pitch" according to the meaning of the invention defines the number of the vanes or screw turns of the two screw spindles relative to each other. This means that, with the preferred pitch of 2:3, one screw spindle has two vanes and the other one has three vanes. In principle, other pitches are also conceivable, such as for example 3:4 or 4:5. Other pitches are also possible.

A pitch of 2:3 is preferable as it represents a good combination of usable transport volume per revolution of the screw spindles for the fluid to be transported and minimal screw spindle length necessary for this.

BRIEF DESCRIPTION OF THE DRAWINGS

The invention will be explained in greater detail below with the aid of a schematic example embodiment by reference to the figures, in which.

DETAILED DESCRIPTION

Figure 1:
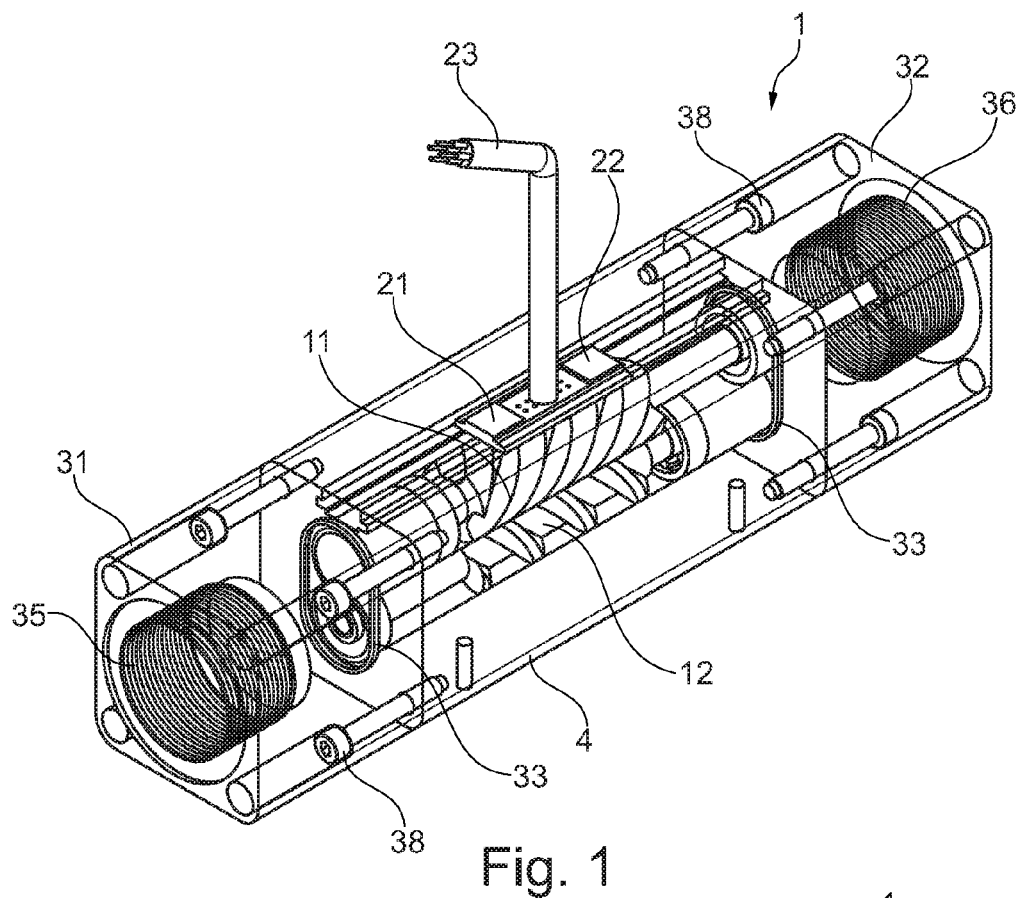
FIG. 1 shows a three-dimensional, partially transparent illustration of a spindle flow meter according to the invention.
Figure 2:
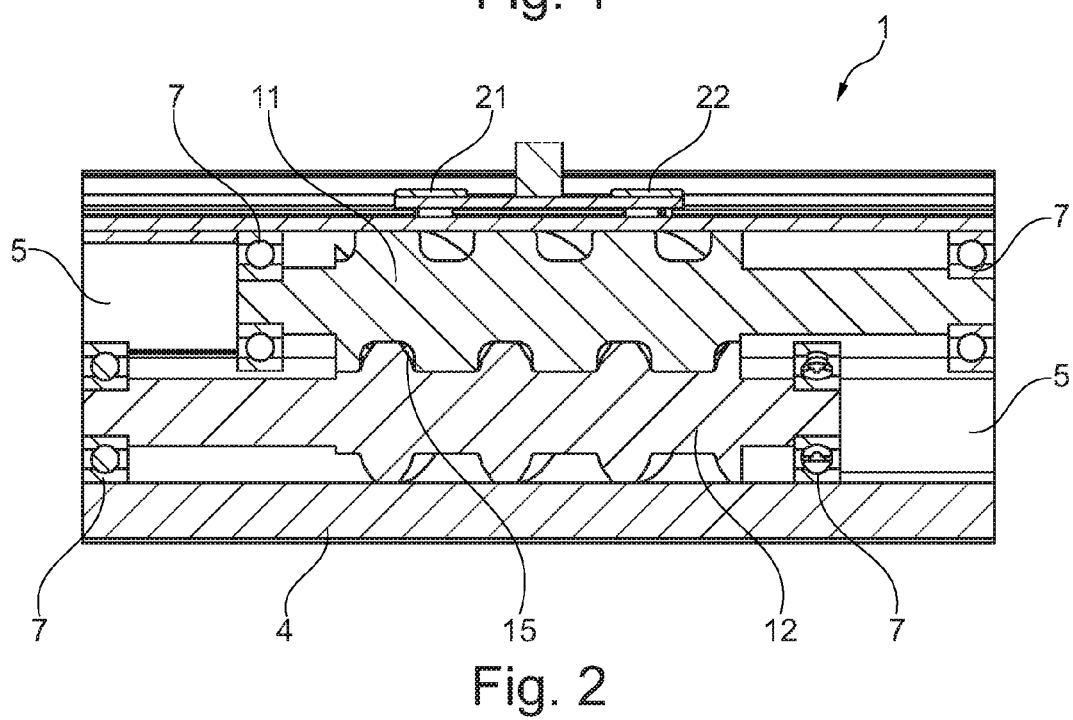
FIG. 2 shows, in a cut-out, a longitudinal section through a spindle flow meter according to the invention.

FIG. 1 shows a perspective transparent view of a spindle flow meter 1 according to the invention which is shown in a cut-out longitudinal section in FIG. 2.

The fundamental structure of the spindle flow meter 1 according to the invention will be explained in greater detail below by reference to FIGS. 1 and 2.

The spindle flow meter 1 consists of a housing 4 which has a front and rear closure element 31, 32. In the front closure element 31 there is an opening with an internal thread which forms a feed channel 35 for the fluid to be measured. Similarly the rear closure element 32 has an opening which is also provided with an internal thread for a discharge channel 36.

The two closure elements 31, 32 are fixed by means of screws 38 to the housing 4 of the spindle flow meter 1. A respective seal 33 is provided at the transition point between the feed channel 35 and the discharge channel 36 with the actual housing 4.

In the housing 4 there are two screw spindles 11, 12 in two recesses. These recesses can preferably be produced by two corresponding bores. The screw spindles 11, 12 have, as will be explained in more detail later with reference to FIG. 3, the same pitch circle diameter.

The two screw spindles 11, 12 are arranged slightly offset relative to each other in the housing 4. They are fixed in the housing 4 by means of roller bearings 7 and spacers 5. The spacers 5 or roller bearings 7 are in turn fixed in the housing by screwing on the two closure elements 31, 32.

If a fluid, in particular a liquid, to be measured flows through the feed channel 35 in the direction of the two screw spindles 11, 12 these are set in rotation and convey partial amounts of the fluid in conveying chambers 15 in the direction of the discharge channel 36. The conveying chambers 15, which can also be described as transport volumes, are produced by the two screw spindles 11, 12 which have a corresponding geometry engaging one inside the other.

The rotation of the screw spindle 11 is detected by two sensors 21, 22. These can be for example Hall sensors which detect a vane 55 of the screw spindle 11 rotating past through a change in the magnetic field. It can, however, also be provided to detect this by other sensors. For this, capacitive sensors could be used for example. The two sensors 21, 22 forward their pulses via their connection cable 23 to an evaluation unit.

Figure 3:
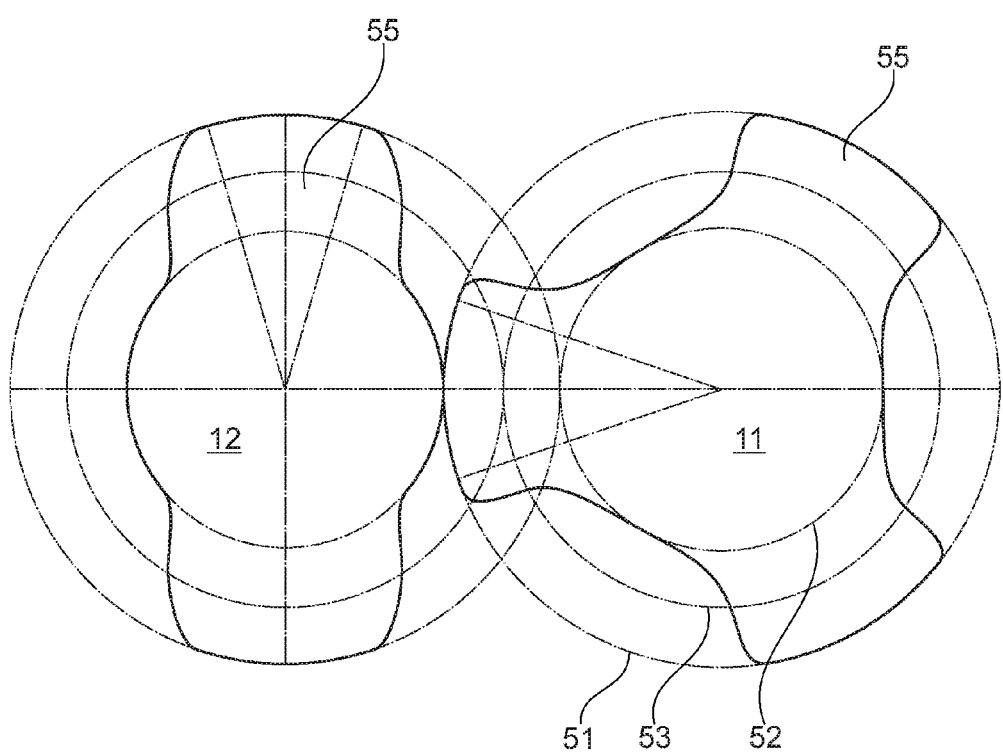
FIG. 3 shows a cross-section through two screw spindles corresponding to the invention.
Figure 4:
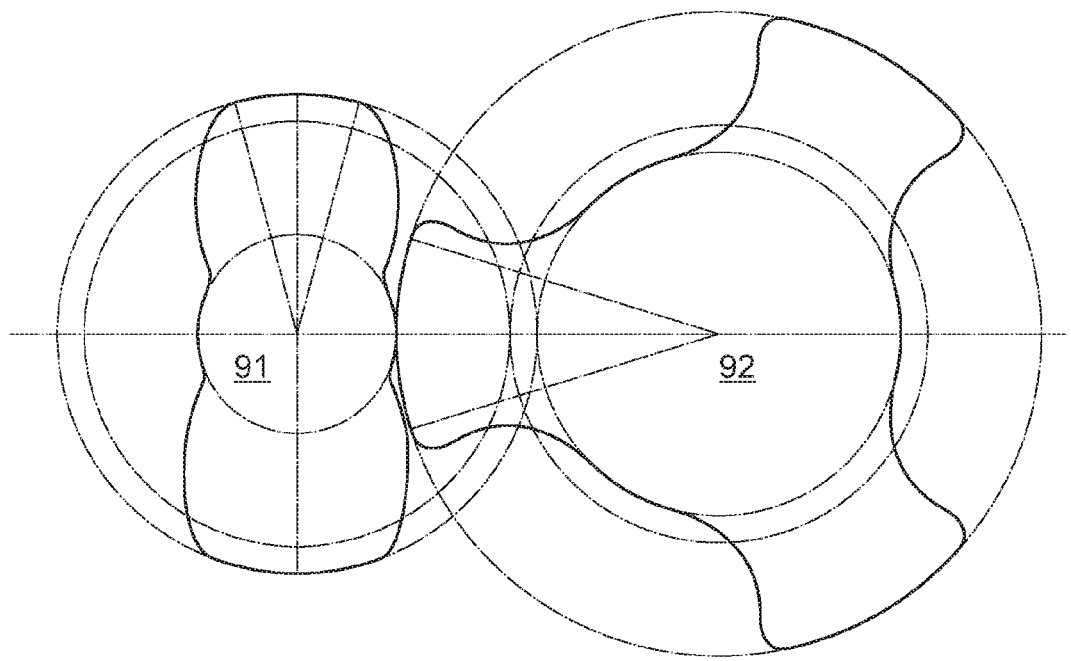
FIG. 4 shows a cross-section through two screw spindles to clarify the rolling properties.
Figure 5:
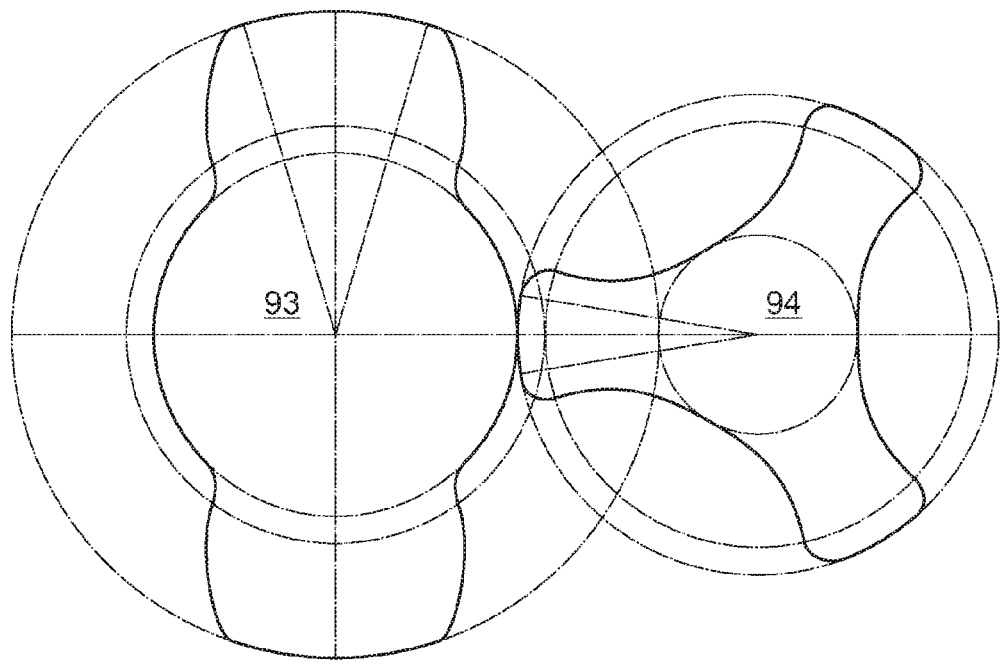
FIG. 5 shows a cross-section through two screw spindles corresponding to a spindle flow meter of the prior art.

FIG. 3 shows a schematic cross-section through the screw spindles 11, 12 of the spindle flow meter 1 according to the invention.

Here, in particular the tip circle 51, the root circle 52 and the pitch circle 53 are shown. As can be seen from FIG. 3, the root circle 52 is a circle around the mid-point or the axis of the screw spindle which connects the points with the lowest elevation.

In contrast, the tip circle 51 is in turn a circle around the mid-point or the axis of the screw spindle which connects the points with the greatest distance from the mid-point to each other.

The pitch circle 53 which is also described as rolling circle is located between the tip circle 51 and the root circle 52 and can be defined within the scope of the invention by the following formula:

$$\text{Pitch circle diameter} = \frac{\text{Root circle diameter} + \text{tip circle diameter}}{2}$$

Through such a design of the two screw spindles 11, 12, it is possible for them to have a relatively good rolling behaviour onto each other and still have a sufficiently large conveying chamber 15, so that the fluid to be measured can be conveyed in acceptable quantities through the two screw spindles 11, 12.

In the embodiment shown here, the screw spindle 11 is shown with three vanes 55 and the screw spindle 12 with two vanes 55. According to the meaning of the invention a "vane" refers in particular to the raised area, or elevation, between two threads or turns of a screw spindle 11, 12. A vane corresponds in the cross-section substantially to the elevation or the tooth of a gearwheel. In principle, screw spindles 11, 12 with more threads or turns, thus more vanes, can also be used. For example screw spindle pairs with 3 and 4 vanes are also possible.

It is thus possible with the spindle flow meter 1 according to the invention to carry out high-precision fluid flow measurements with a high long-term precision.

The invention claimed is:
1. Spindle flow meter with
   a housing with a first and a second cylindrical recess which overlap each other and are arranged parallel to each other,
   in which a first and a second multi-turn screw spindle are arranged engaging in each other, which are each fixed to be freely rotatable in the housing,
   wherein the diameter of the first recess corresponds substantially to the tip circle diameter of the first screw spindle and the diameter of the second recess substantially to the tip circle diameter of the second screw spindle,
   wherein
   the pitch circle diameters of the first and the second screw spindles are of equal size.
2. Spindle flow meter according to claim 1, wherein
   the root circle diameter of the first screw spindle and the root circle diameter of the second screw spindle are of equal size.
3. Spindle flow meter according to claim 1, wherein
   the tip circle diameter of the first screw spindle and the tip circle diameter of the second screw spindle are of equal size.
4. Spindle flow meter according to claim 1, wherein
   the first and the second screw spindles are of equal length.
5. Spindle flow meter according to claim 1, wherein
   the first and the second screw spindles are arranged offset relative to each other in the flow direction, an overlap region being present.
6. Spindle flow meter according to claim 1, wherein
   a feed channel and a discharge channel are provided coaxially with the axes of the first and the second screw spindle which each end in the region of the two screw spindles.
7. Spindle flow meter according to claim 1, wherein
   the first and the second recess are produced by means of bores in the housing.
8. Spindle flow meter according to claim 1, wherein
   the housing respectively has two cover-like closure elements, through which the feed channel or discharge channel extends.
9. Spindle flow meter according to claim 1, wherein
   two sensors are provided on the housing laterally with respect to one of the two screw spindles to detect a vane of one of the two screw spindles rotating past the sensors.
10. Spindle flow meter according to claim 1, wherein
    the recesses and the screw spindles have such dimensions that more than 300 pulses per litre of fluid flow are generated respectively at the sensors.
11. Spindle flow meter according to claim 1, wherein
    the screw spindles have a pitch of 2:3.

* * * * *